United States Patent
Knuth

(10) Patent No.: US 8,573,852 B2
(45) Date of Patent: Nov. 5, 2013

(54) ROLLER CIRCLE ASSEMBLY FOR HEAVY MACHINERY

(75) Inventor: Jason Knuth, Brookfield, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 206 days.

(21) Appl. No.: 13/163,402

(22) Filed: Jun. 17, 2011

(65) Prior Publication Data

US 2012/0321239 A1    Dec. 20, 2012

(51) Int. Cl.
F16C 19/30    (2006.01)

(52) U.S. Cl.
USPC ........... 384/618; 384/593; 384/619; 384/622; 308/222; 414/687; 74/421

(58) Field of Classification Search
USPC ......... 384/618, 619, 621–623, 548, 572–574, 384/540, 591, 593; 74/640
See application file for complete search history.

(56) References Cited

U.S. PATENT DOCUMENTS

| | | | |
|---|---|---|---|
| 3,985,406 A | 10/1976 | Baron | |
| 4,236,863 A * | 12/1980 | Baron | 414/687 |
| 4,239,305 A * | 12/1980 | Baron | 384/593 |
| 4,248,488 A * | 2/1981 | Sable | 384/593 |
| 4,307,621 A * | 12/1981 | Merron | 74/421 A |
| 4,395,140 A * | 7/1983 | Sable | 384/99 |
| 4,582,436 A | 4/1986 | Merron | |
| 4,622,860 A * | 11/1986 | Cametti et al. | 74/448 |
| 4,723,852 A | 2/1988 | Ehret | |
| 5,058,753 A | 10/1991 | Malik et al. | |
| 5,121,561 A * | 6/1992 | Palfreyman | 37/395 |
| 5,154,012 A * | 10/1992 | Kallenberger | 37/397 |
| 5,205,657 A | 4/1993 | Feld | |
| 5,333,510 A | 8/1994 | Anderson et al. | |
| 5,676,471 A | 10/1997 | Kallenberger et al. | |
| 7,419,064 B2 * | 9/2008 | Miyazaki et al. | 212/181 |
| 7,572,062 B2 * | 8/2009 | Morawski et al. | 384/593 |

OTHER PUBLICATIONS

Torrington, Thrust Bearings, Catalog, Jan. 11, 1999, 20 pages.

* cited by examiner

Primary Examiner — Richard W Ridley
Assistant Examiner — Wiliam Santosa
(74) Attorney, Agent, or Firm — Michael Best & Friedrich LLP

(57) ABSTRACT

A heavy earth-moving machine having a lower structure and an upper structure rotatably supported by the lower structure for rotation about an axis. A substantially circular lower rail is mounted on the lower structure and includes an inclined lower surface. A substantially circular upper rail is mounted on the upper structure and includes a substantially planar upper surface that is oriented substantially perpendicular to the axis. Tapered rollers support the upper rail above the lower rail for rotation of the upper rail about the axis. Each roller engages both the upper surface and the lower surface and defines and rotates about a roller axis that intersects the axis at a non-perpendicular angle.

14 Claims, 4 Drawing Sheets

ROLLER CIRCLE ASSEMBLY FOR HEAVY MACHINERY

BACKGROUND

In heavy earth moving equipment, such as draglines or power shovels for mining, an upper structure is rotatably supported on a lower structure by a roller circle assembly. A boom typically extends from the upper structure, and a sheave is placed on the upper end of the boom. A hoist rope extends generally downwardly from the sheave to a bucket or dipper, depending on the application. In the dragline application, the bucket is also connected to the upper structure by a drag rope. Both the hoist rope and the drag rope can control the movement of the bucket. The lower structure of the dragline typically is mounted on treads or a walking tub mechanism for movement over the ground.

The roller circle assembly defines an axis of rotation for the upper structure relative to the lower structure. A lifting pin can extend along the axis and connect the upper structure to the lower structure. A pinion gear drive may also be mounted on the upper structure for engagement with a ring gear mounted on the lower structure that operates to rotate the upper structure relative to the lower structure. The roller circle may include an upper circular rail coupled to the upper structure, a lower circular rail coupled to the lower structure, and rollers positioned between the circular rails. The rails can be in segments. The rollers are typically tapered, having their larger diameter located radially outward.

Roller circle assemblies in heavy earth moving equipment can measure from three meters to more than 20 meters in diameter. Very heavy loads, amounting to several hundred metric tons, may be transmitted through the bearing assemblies to the lower structure, and the overturning moments created by loads on the boom can create highly concentrated stresses on small segments of the bearing assembly. A misalignment between the upper and the lower structures can further contribute to highly concentrated stresses. This misalignment can be due to a gap around the lifting pin that is created for built-in tolerance or through wear. Moreover, the loading along a given arc length of the roller circle can be non-uniform during operations such as digging, dumping, transferring, and so forth. Under dynamic non-uniform loading, the rollers of the roller circle assemblies may twist or distort relative to the rails, further concentrating the load on a relatively small contact area and bringing about costly failures.

SUMMARY

In one exemplary embodiment, a heavy earth-moving machine includes a lower structure and an upper structure rotatably supported by the lower structure for rotation about an axis. A substantially circular lower rail is mounted on the lower structure and includes an inclined lower surface. The lower rail is substantially concentric with the axis. A substantially circular upper rail is mounted on the upper structure and includes a substantially planar upper surface that is oriented substantially perpendicular to the axis. Tapered rollers support the upper rail above the lower rail for rotation of the upper rail about the axis. Each roller engages both the upper surface and the lower surface.

In another exemplary embodiment, a heavy earth-moving machine includes a gudgeon assembly defining a central axis, a frame assembly that rotates about the central axis, and a roller-circle assembly supporting the frame assembly. The roller-circle assembly includes a lower rail having an inclined lower surface, an upper rail having a substantially planar upper surface oriented substantially perpendicular to the central axis, and a plurality of tapered rollers positioned between the lower rail and the upper rail. Each roller engages both the upper surface and the lower surface.

In yet another exemplary embodiment, a bearing assembly rotatably supports an upper structure of a heavy earth-moving machine above a lower structure of the heavy earth-moving machine for rotation about a central axis. The bearing assembly includes a lower rail that defines a lower surface that is inclined relative to the axis, and an upper rail that defines a substantially planar upper surface oriented substantially perpendicular to the axis. The upper rail is rotatable relative to the lower rail about the central axis. The bearing assembly also includes a plurality of tapered rollers that are rotatably positioned between the upper and lower rails. The plurality of rollers support the upper rail for rotation relative to the lower rail about the axis.

Other aspects of the invention will become apparent by consideration of the detailed description and accompanying drawings.

It should be understood that the invention is not limited in its application to the details of construction and the arrangements of the components set forth in the following description or illustrated in the above-described drawings. The invention is capable of other embodiments and of being practiced or being carried out in various ways. Also, it is to be understood that the phraseology and terminology used herein is for the purpose of description and should not be regarded as limiting.

DETAILED DESCRIPTION

Figure 1:
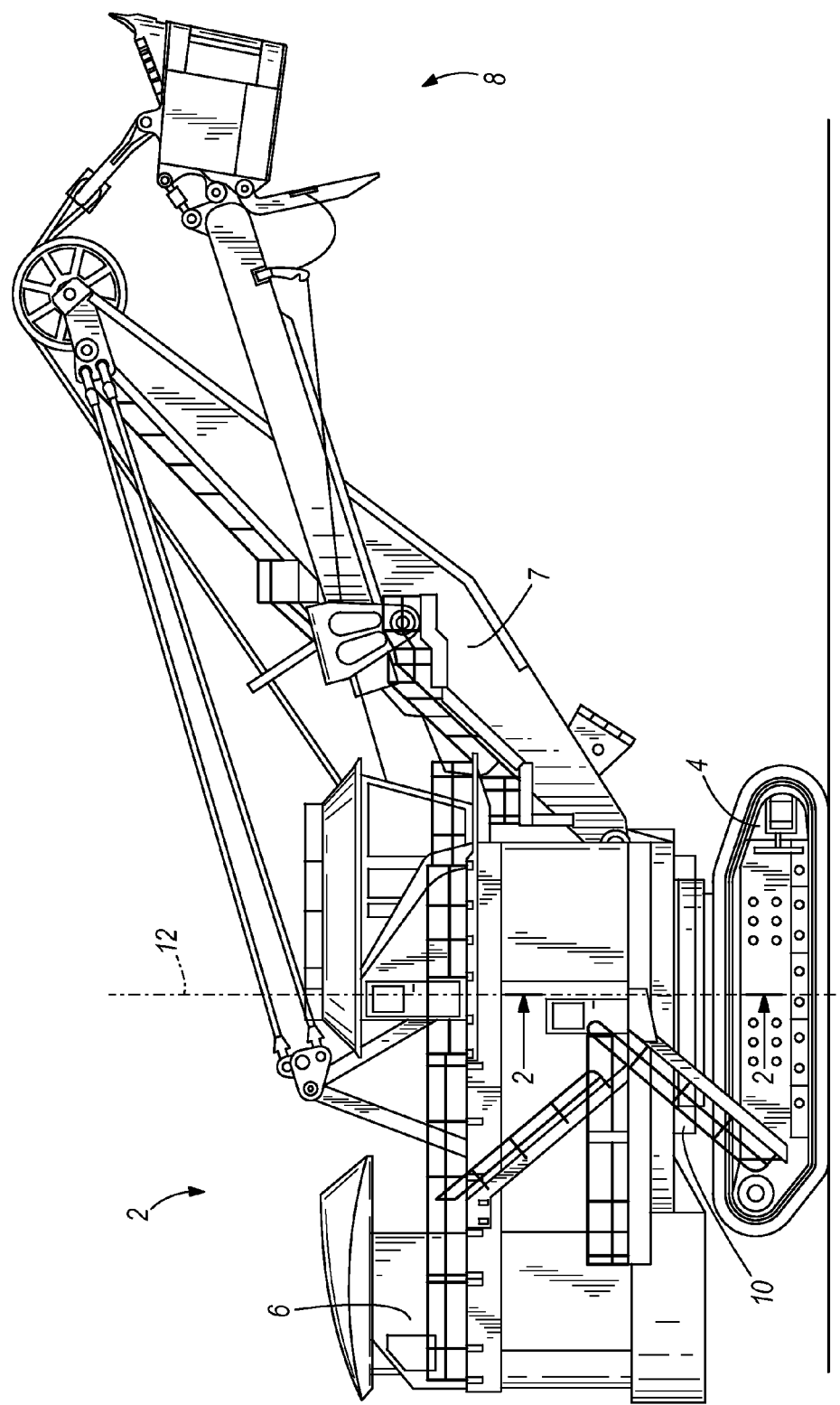
FIG. 1 is a side view of a power shovel including a roller-circle assembly.

FIG. 1 illustrates a power shovel 2 including a lower structure, tub, or base 4, which may be in the form of a treaded drive-mechanism or walking mechanism, and an upper structure, or cab 6 rotatably supported above the base 4. A boom 7 extends from the cab 6 and supports a dipper 8. In combination with the boom 7, a series of sheaves, guides, and wires are used to maneuver the dipper 8 for excavating and mining operations.

Figure 2:
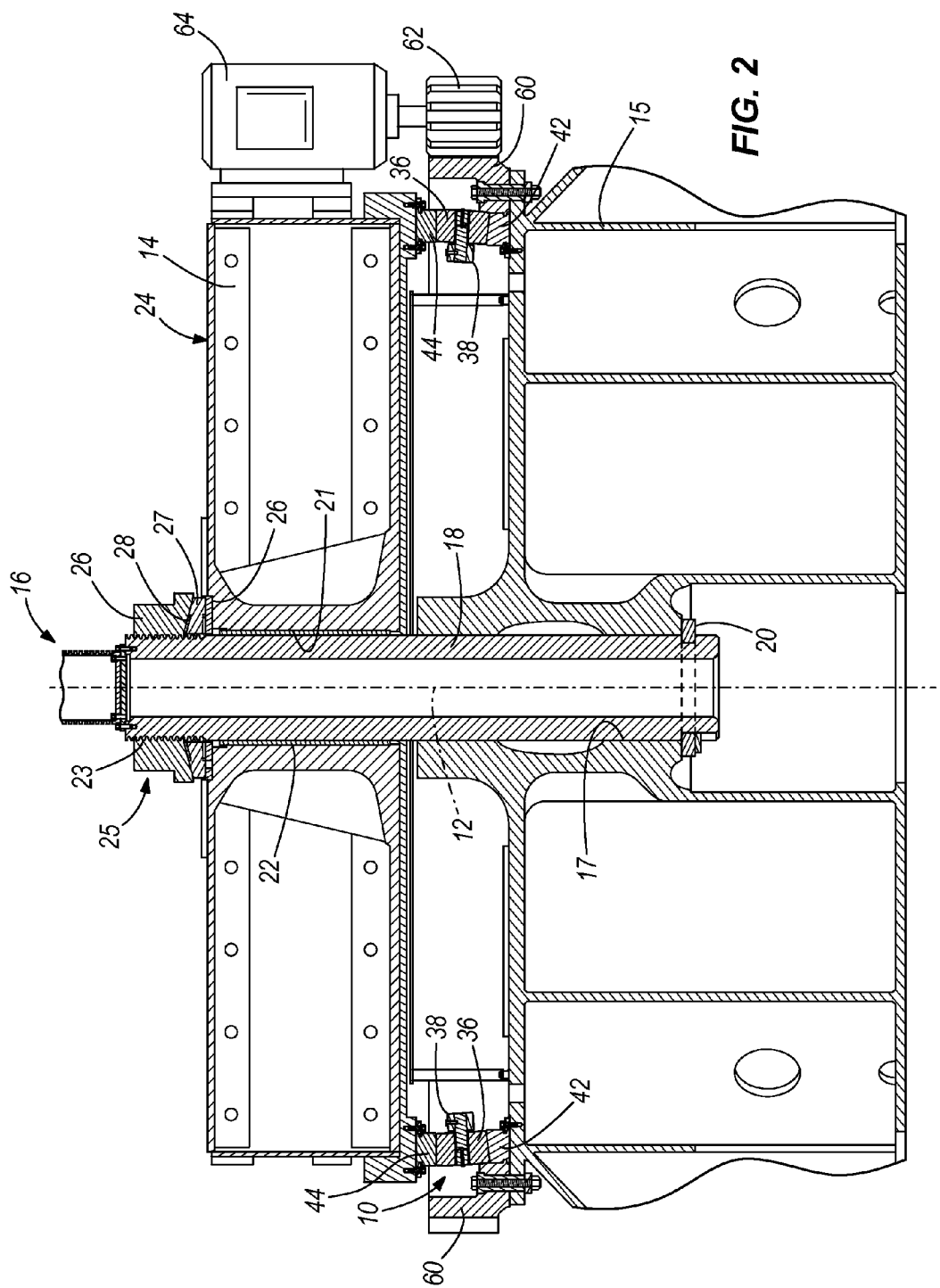
FIG. 2 is a section view taken along line 2-2 of FIG. 1.

With reference also to FIG. 2, a roller-circle assembly 10 is positioned between the base 4 and the cab 6 and rotatably supports the cab 6 for rotation about a central axis 12. More specifically, the roller-circle assembly 10 is mounted between an upper revolving frame assembly 14, which supports the cab 6, and a lower frame assembly 15 associated with the base 4. The upper and lower frame assemblies 14, 15 are further rotatably coupled to one another by a gudgeon assembly 16. The roller-circle assembly 10 and the gudgeon assembly 16 cooperate to transfer loads from the upper frame assembly 14 to the lower frame assembly 15.

The gudgeon assembly 16 is coupled to and extends between the upper and lower frame assemblies 14, 15. The lower frame assembly 15 defines an aperture 17 that receives a lifting pin 18. The lifting pin 18 is press-fit into the aperture 17 and is further secured to the lower frame assembly 15 by a securing ring 20. The lifting pin 18 can generally be considered to define the axis 12 about which the cab 6 and upper frame assembly 14 rotate with respect to the base 4 and lower frame assembly 15. The lifting pin 18 extends upwardly from the lower frame assembly 15 and through an aperture 21 defined by the upper frame assembly 14. The aperture 21 is sized so that the upper frame assembly 14 can rotate freely around the lifting pin 18. In some constructions, a sleeve or bushing 22 may be positioned between the lifting pin 18 and the upper frame assembly 14 to facilitate such rotation.

A threaded portion 23 of the lifting pin 18 extends beyond a top surface 24 of the upper frame assembly 14, and a nut assembly 25 is secured to the threaded portion 23 to couple the upper frame assembly 14 to the lifting pin 18. The nut assembly 25 includes a threaded nut 26, a thrust member 27, and bearing member 28 between the nut 26 and the thrust member 27. Once installed and properly tightened, the threaded nut 26 is keyed to the lifting pin 18 to prevent relative rotation between the threaded nut 26 and the lifting pin 18. Opposing surfaces of the nut 26 and the thrust member 27 are inclined relative to the central axis 12. The bearing member 28 engages the opposing surfaces of the nut 26 and thrust member 27 to afford relative rotation between the nut 26 and thrust member 27. During rotation of the upper frame assembly 14 relative to the lower frame assembly 15, the lifting pin 18 and the nut 26 remain substantially fixed relative to the lower frame assembly 15, while the thrust member 27 rotates with the upper frame assembly 14.

Figure 3:
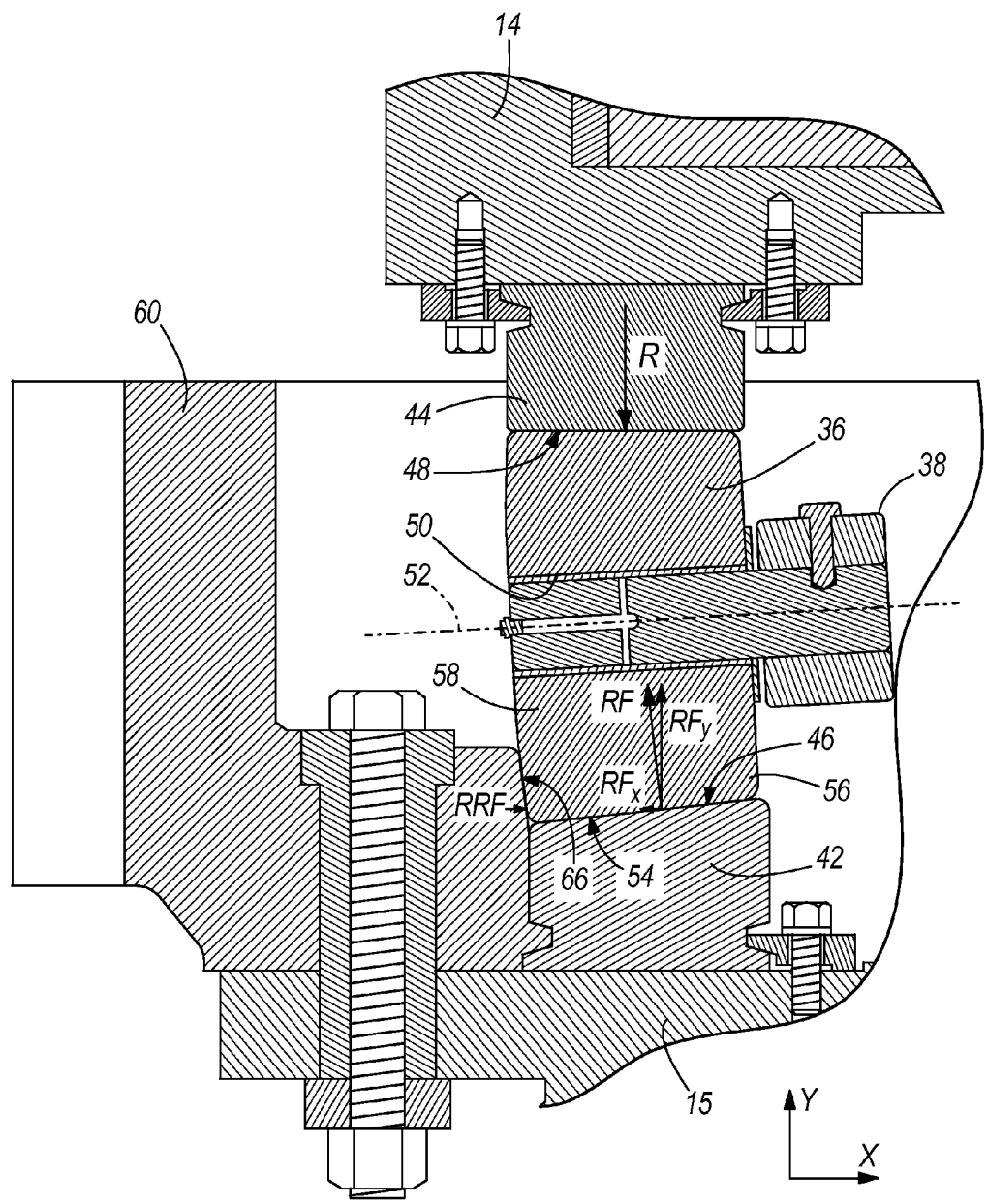
FIG. 3 is an enlarged portion of the section view of FIG. 2 showing a roller area of the roller-circle assembly.
Figure 4:
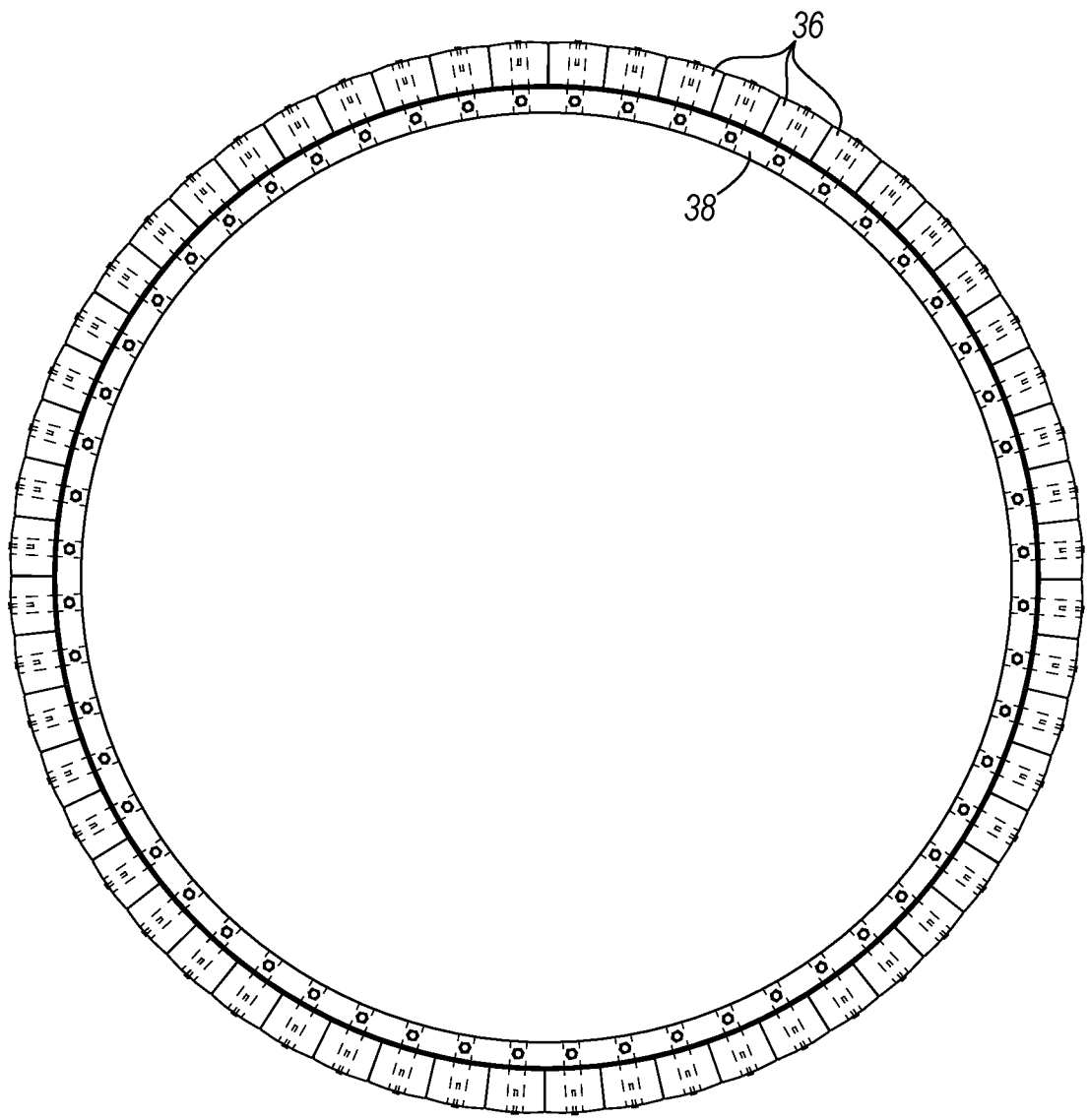
FIG. 4 is a top view of the roller-circle assembly from the shovel of FIG. 1.

With reference also to FIGS. 3-4, the roller-circle assembly 10 includes a plurality of tapered rollers 36 coupled together by a carrier ring assembly 38 that couples the rollers 36 to each other. Each roller 36 defines a generally frusto-conical rolling surface 54 and includes a reduced diameter portion 56 at an inner end (with respect to the central axis 12) and an enlarged diameter portion 58 at an outer end (with respect to the central axis 12). The rollers 36 are positioned between a generally circular lower rail 42 and a generally circular upper rail 44.

The lower rail 42 is coupled to the lower frame assembly 15 and the upper rail 44 is coupled to the upper frame assembly 14. The lower rail 42 defines a generally frusto-conical lower surface 46 having its inner circumferential edge elevated relative to its outer circumferential edge. The upper rail 44 defines a substantially planar and annular upper surface 48 oriented substantially perpendicular to the central axis 12. During rotation of the upper frame assembly 14 relative to the lower frame assembly 15, the rolling surfaces 54 of the rollers 36 roll along the lower surface 46 of the lower rail 42 and the upper surface 48 of the upper rail 44. In some constructions, the upper and lower rails 44, 42 are each made up of a plurality of individual arcuate rail portions arranged to form the circular upper or lower rails 44, 42.

As best shown in FIG. 3, each roller 36 defines a central bore 50 which in turn defines a roller axis 52 about which the roller 36 rotates when the upper rail 44 rotates about the central axis 12 relative to the lower rail 42. Due to the orientation of the lower surface 46 and the upper surface 48, the roller axis 52 intersects the central axis 12 at a non-perpendicular angle.

The lower surface 46 and the upper surface 48 are oriented relative to the central axis 12 based at least in part upon the angle defined by the frusto-conical rolling surfaces 54 of the rollers 36. As discussed above, while the lower surface 46 is inclined relative to the central axis 12, the upper surface 48 is oriented substantially perpendicular to the central axis 12.

With reference to FIGS. 2 and 3, to rotate the upper frame assembly 14 relative to the lower frame assembly 15, the shovel 2 includes a ring gear 60 coupled to the lower frame assembly 15 and generally encircling and concentric with the roller circle assembly 10. A drive 64 is coupled to the upper frame assembly 14 and drives a pinion gear 62 that is drivingly engaged with the ring gear 60. Thus, when the drive 64 rotates the pinion gear 62, the upper frame assembly 14 rotates relative to the lower frame assembly 15.

In the illustrated construction, the ring gear 60 includes a generally inwardly-facing frusto-conical contact surface 66 that counter-acts radially outward deflection of the rollers 36. Depending upon the loads being supported by the roller circle assembly 10, the outer ends of one or more rollers 36 may deflect radially outwardly and contact the contact surface 66. In this way the contact surface 66 may assist in maintaining proper alignment of the rollers 36 relative to the upper and lower rails 44, 42. As a result, in some constructions, the ring gear 60 may be considered part of the roller circle assembly 10. For example, the ring gear 60 can be integral with the lower rail 42. In alternative constructions, a separate, dedicated ring may encircle the rollers 36 and provide a suitable contact surface for engagement by the outer ends of the rollers 36.

Compared to a roller-circle assembly wherein both the upper and lower surfaces of the lower and upper rails are generally frusto-conical or otherwise inclined relative to the central axis 12, having the upper surface 48 oriented substantially perpendicular to the central axis 12 reduces or eliminates forces that tend to cause misalignment of the rollers 36 with respect to the upper and lower rails 44, 42, thereby reducing the maximum stresses applied to the various components. For example, as shown in the free-body diagram of FIG. 3, a load applied from the upper rail 44 onto the roller 36 in the direction of the central axis 12 creates a force R on the upper part of roller 36. Because the surface 48 is perpendicular to the central axis 12, the reaction force from the surface 48 is directed exclusively in the axial direction.

The force R is transmitted through the roller 36 and is reacted out against the lower surface 46 of the lower rail 42. The lower surface 46 is inclined relative to the direction of the force R. The resulting reaction force RF, which is normal to the lower surface 46 and thus angled relative to the central axis 12, includes a component $RF_y$ in a direction substantially parallel to the central axis 12, and $RF_x$ in a direction perpendicular to the central axis 12 that tends to push the roller 36 radially outwardly and against the contact surface 66. The contact surface 66 counter-acts $RF_x$ with a radial reaction force RRF in a direction perpendicular to the central axis 12. Because $RF_x$ of the roller 36 and RRF of the contact surface 66 are applied at a substantially similar height, there is little, if any overturning moment tending to increase or decrease the angle of the roller axis 52 relative to the central axis 12. Reducing the overturning moment can in turn reduce the load and stress on the roller 36 and create a more uniform stress distribution on the lower surface 46, rolling surface 54, and upper surface 48.

Compare the foregoing to a configuration where the upper surface of the upper rail is inclined relative to the central axis 12—with an angled upper surface, loading of the roller by the upper rail results in a reaction force between the upper surface and the roller having a component directed radially outwardly and perpendicular to the central axis 12. Because the line of action of this component force is spaced a fairly significant distance from the contact surface 66, a moment is created that tends to rotate the roller in a counter-clockwise direction (as viewed in FIG. 3) about the upper edge of the contact surface 66. This moment tends to misalign the roller relative to the upper and lower rails and relative to the contact surface 66, thus creating point and line loading situations that can dramatically increase the stresses applied to these components. Incorporating an upper rail 44 having a flat upper surface 48 substantially eliminates the moment that would otherwise tend to misalign the roller and thus improves component life by reducing overall stresses in the various parts.

Although the foregoing description refers specifically to a shovel, it should be appreciated that the roller-circle assembly 10 discussed further herein may be used in other applications such as draglines, cranes, wheel excavators, cross-pit conveyors, and the like where an upper structure or cab 6 rotates relative to a lower structure or base 4.

What is claimed is:

1. An earth-moving machine comprising:
    a lower structure;
    a ring gear mounted on the lower structure;
    an upper structure rotatably supported by the lower structure for rotation about an axis;
    a drive mounted to the upper structure;
    a pinion gear mounted on the drive and engaging the ring gear, wherein rotation of the pinion gear by the drive rotates the upper structure about the axis;
    a substantially circular lower rail mounted on the lower structure and having an inclined lower surface, the lower rail substantially concentric with the axis;
    a substantially circular upper rail mounted on the upper structure and having a substantially planar upper surface oriented substantially perpendicular to the axis;
    a plurality of tapered rollers supporting the upper rail above the lower rail for rotation of the upper rail about the axis, each roller engaging both the upper surface and the lower surface, wherein the ring gear includes a contact surface that maintains alignment of the rollers with respect to the upper rail and the lower rail.

2. The earth-moving machine of claim 1, wherein each roller is rotatable about a roller axis that intersects the axis at a non-perpendicular angle.

3. The earth-moving machine of claim 1, further comprising a gudgeon assembly that defines the axis.

4. The earth-moving machine of claim 3, wherein the lower structure includes a lower frame assembly and the gudgeon assembly includes a pin, and wherein the pin is fixedly coupled to the lower frame assembly.

5. The earth-moving machine of claim 1, wherein the ring gear generally encircles the lower rail.

6. The earth-moving machine of claim 1, wherein the contact surface is substantially frusto-conical and faces generally radially inwardly.

7. An earth-moving machine comprising:
    a gudgeon assembly defining a central axis;
    a frame assembly that rotates about the central axis;
    a drive mounted to the frame assembly;
    a roller-circle assembly supporting the frame assembly, the roller-circle assembly including a lower rail having an inclined lower surface, an upper rail having a substantially planar upper surface oriented substantially perpendicular to the central axis, a plurality of tapered rollers positioned between the lower rail and the upper rail, each roller engaging both the upper surface and the lower surface;
    a ring gear coupled and fixed with respect to the lower rail, wherein the ring gear includes a contact surface that maintains alignment of the rollers with respect to the upper rail and the lower rail; and
    a pinion gear mounted on the drive and engaging the ring gear, wherein rotation of the pinion gear by the drive rotates the frame assembly about the axis.

8. The earth-moving machine of claim 7, further comprising a lower frame assembly supporting the gudgeon assembly, wherein the gudgeon assembly includes a pin that is substantially concentric with the axis.

9. The earth-moving machine of claim 7, wherein each roller is rotatable about a roller axis that intersects the central axis at a non-perpendicular angle.

10. The earth-moving machine of claim 7, wherein the ring gear generally encircles the lower rail.

11. The earth-moving machine of claim 7, wherein the contact surface is substantially frusto-conical and faces generally radially inwardly.

12. A bearing assembly for rotatably supporting an upper structure of an earth-moving machine above a lower structure of the earth-moving machine, the upper structure rotatable about a central axis, the bearing assembly comprising:
    a lower rail defining a lower surface that is inclined relative to the axis;
    a ring gear coupled and fixed with respect to the lower rail, wherein the ring gear generally encircles the lower rail;
    an upper rail defining a substantially planar upper surface oriented substantially perpendicular to the axis, the upper rail rotatable relative to the lower rail about the central axis; and
    a plurality of tapered rollers rotatably positioned between the upper and lower rails, the plurality of rollers supporting the upper rail for rotation relative to the lower rail about the axis, wherein the ring gear includes a contact surface that maintains alignment of the rollers with respect to the upper rail and the lower rail.

13. The bearing assembly of claim 12, each roller defining and rotating about a roller axis that intersects the axis at a non-perpendicular angle.

14. The bearing assembly of claim 12, wherein the contact surface is substantially frusto-conical and faces generally radially inwardly.

* * * * *